United States Patent [19]

St. Louis

[11] 4,216,500

[45] Aug. 5, 1980

[54] ENCODING AND DECODING SYSTEM

[76] Inventor: Raymond F. St. Louis, 67 Hillside Ave., West Caldwell, N.J. 07006

[21] Appl. No.: 960,178

[22] Filed: Nov. 13, 1978

[51] Int. Cl.² .......................... H04N 7/16; H04K 1/02
[52] U.S. Cl. .................................... 358/118; 358/114; 455/29
[58] Field of Search ................ 325/464, 461; 358/114, 358/118, 120

[56] References Cited

U.S. PATENT DOCUMENTS

| | | | |
|---|---|---|---|
| 3,991,371 | 11/1976 | Shelby | 325/464 |
| 4,024,575 | 5/1977 | Harney et al. | 358/118 |
| 4,034,402 | 7/1977 | Brian | 358/118 |
| 4,081,831 | 3/1978 | Tang | 358/114 |
| 4,091,413 | 5/1978 | Herman | 358/118 |

Primary Examiner—S. C. Buczinski
Attorney, Agent, or Firm—Donald N. Timbie

[57] ABSTRACT

The frequencies of a channel containing at least one modulated carrier are encoded by heterodyning them with an alternating current wave having a cyclically varying frequency, and decoding of the encoded channel is achieved by deriving a signal corresponding to the cyclic variation in the frequencies of an encoded channel and heterodyning the encoded channel with an alternating current wave having a frequency that is varied in accordance with the signal.

3 Claims, 4 Drawing Figures

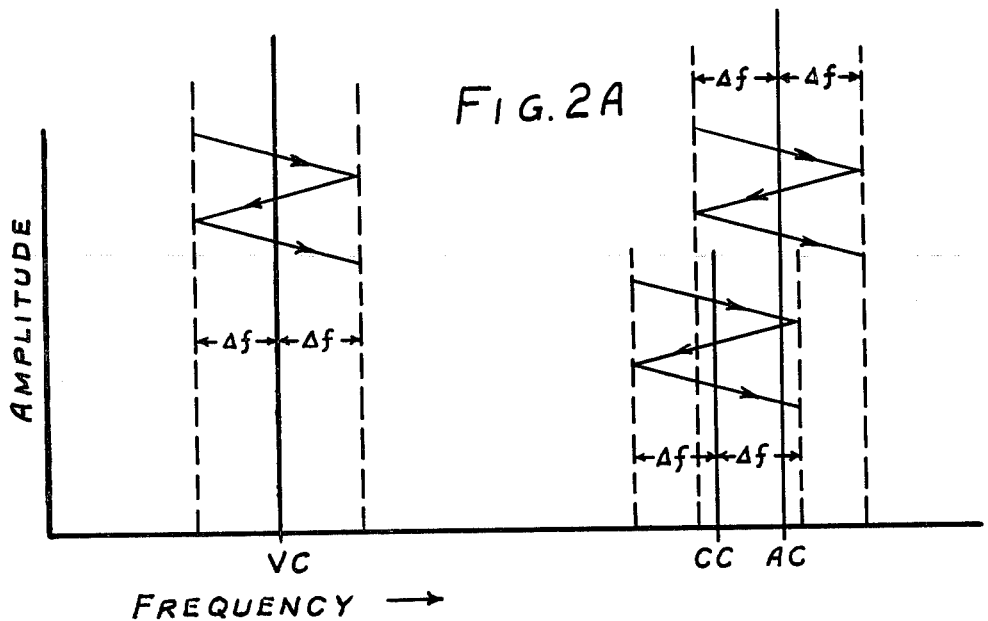
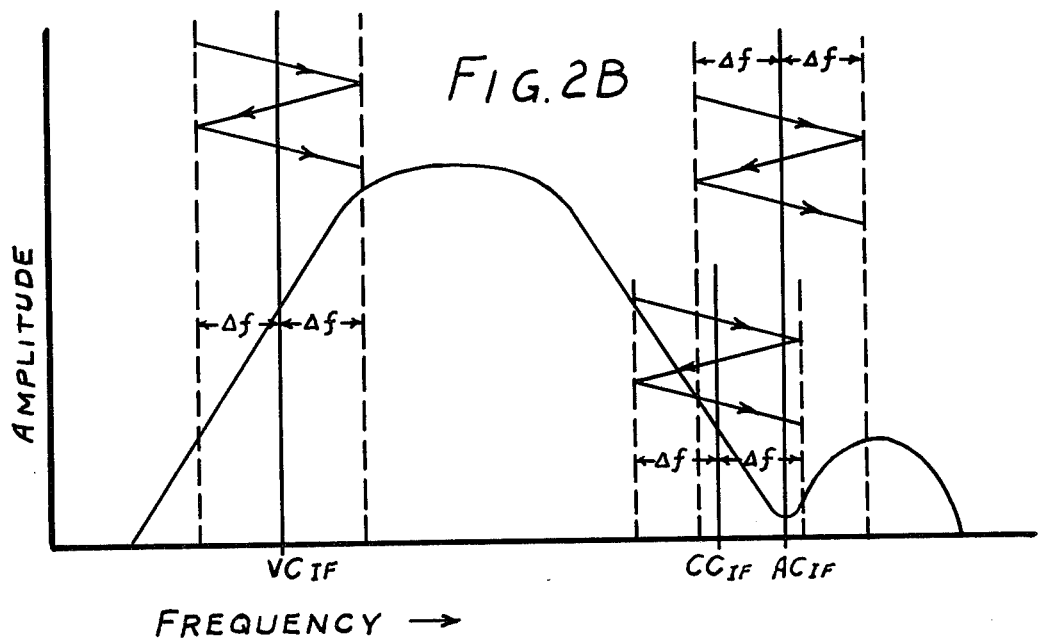

ENCODING AND DECODING SYSTEM

BACKGROUND OF THE INVENTION

Previous techniques employed in pay television systems for encoding television channels so that they are unwatchable on standard TV receivers have involved the alteration of the video modulation or of the synchronizing pulses. The decoders furnished to the customers include circuits for restoring the video modulation and/or the synchronizing pulses to an approximation of their original form, but if this is to be done with precision, the circuits are so costly that compromise performance has been accepted. Other techniques employ an interfering carrier inserted at the midpoint of the video pass band of the TV channel so as to render the picture unwatchable. A channel that is scrambled in this manner is decoded at the subscriber's TV receiver by removing the interfering carrier with a narrow band-stop filter. The filter not only removes some of the video modulation, but it also causes changes in group delay of the video frequencies near the frequency of the interfering carrier. These effects are reduced by precorrecting the coded channel at the encoder, but because restoration of the missing video can never be realized, there is a loss in picture definition.

BRIEF DISCUSSION OF THE INVENTION

The invention described herein makes no alteration to the TV channel modulation, but controls the frequencies of the channel in such manner as to cause the image produced on a standard TV receiver to be distorted. This results in lower costs, less complex decoding equipment, and does not have the distortion problems that may be inherent in other systems.

In accordance with this invention, the television channels to be encoded are translated into a desired portion of the spectrum by mixing them with a first alternating current wave. Encoding is achieved by cyclically varying the frequency of the first wave, and hence all frequencies within the channels, at an audio rate. The amount by which the frequency is varied is sufficient to make it impossible for a standard television receiver to recover intelligible video and audio information. In a decoder, the encoded channels are mixed with a second alternating current wave of such frequency as to translate at least one of the encoded channels into the band of frequencies of one of the standard TV channels. This is achieved by providing means for varying the frequency of the second alternating current wave in synchronism with and to the same extent as the first alternating current wave. In this way, the effect of the frequency variation of the channels caused by the first alternating current wave is eliminated so that the video and audio information can then be recovered by a properly tuned standard television receiver.

DESCRIPTION OF THE DRAWINGS

FIG. 2A illustrates the spectrum of an encoded channel;

FIG. 2B illustrates the IF response of a television receiver; and

ENCODER

Figure 1:
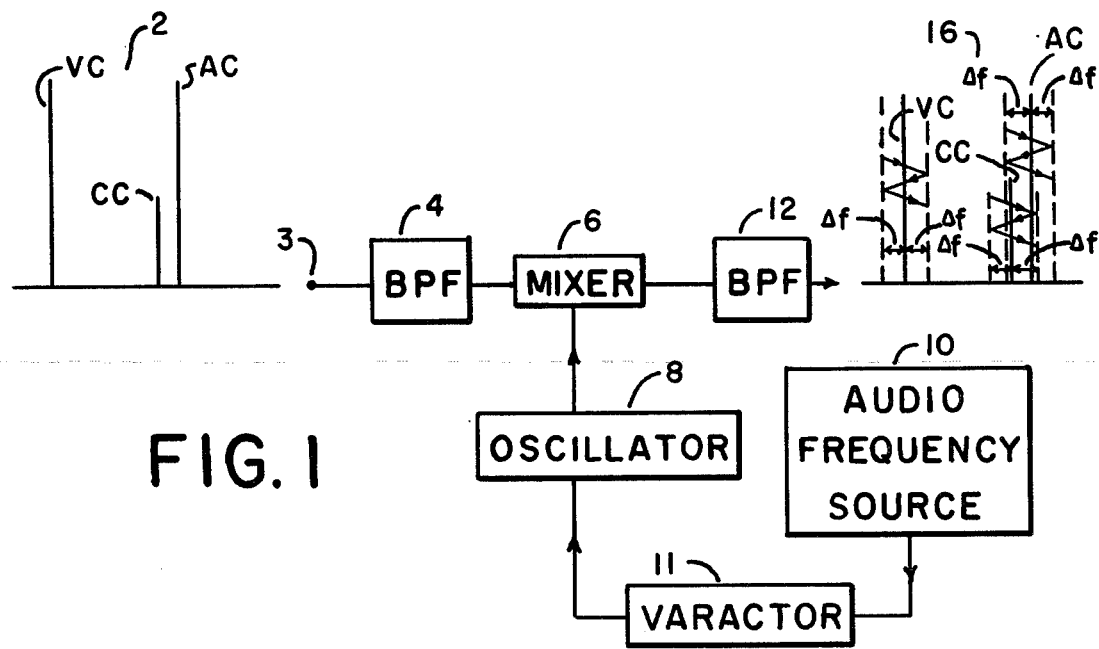
FIG. 1 schematically illustrates an encoder constructed in accordance with the invention.

In FIGURE 1, the wave 2 represents the radio frequency spectrum of one of a band of TV channels to be encoded in which VC is the visual carrier, CC is the chroma subcarrier, and AC is the aural carrier. The carriers of the various channels may be modulated and transmitted in accordance with any standards but, for purposes of illustration, they are considered to be transmitted in the manner presently approved by the Federal Communications Commission of the United States. The sidebands of the carriers are not shown in the interest of clarity. The channels to be encoded, including the channel signals 2, are applied to an imput 3 of an encoder. A band pass filter 4, which has a bandwidth sufficient to pass all the encoded channels, it connected between the input 3 and a mixer 6 wherein all channel signals including the channel signals 2 are heterodyned with an alternating current wave provided by an oscillator 8. The frequency of the alternating current wave is varied with respect to a center frequency at an aural rate by an aural signal provided by a source 10. The center frequency provided by the oscillator 8 is such as to translate the frequencies of the band of encoded channels passed by the band pass filter 4 to any desired portion of the spectrum, such as the space between the low frequency range occupied by the TV channels 2–6 and the high frequency range occupied by the channels 7–13. If desired, the band of encoded channels passed by the band pass filter 4 can be translated so as to occupy a portion of the spectrum between channel 13 and 300 MHz. In either case, the appropriate band of encoded TV channels at the output of the mixer 6 is selected by a band pass filter 12 and supplied to an output 14 that may be connected to the cables of the signal distribution system.

Frequency modulation of the output of the oscillator 8 at an aural rate can be effected in many ways understood by those skilled in the art. Although the output of the source 10 need not necessarily be a sine wave, it is generally simpler if it is. If the output signal of the source 10 is a voltage, the frequency of the oscillator 8 may be varied by applying the voltage to a varactor 11, that is coupled to the oscillator 8 so as to change its tuning capacitance, not shown. The amount of frequency variation produced at the output of the oscillator 8 will be explained when the response of a standard receiver is considered below, but it is illustrated in a qualitative manner by the carrier variations shown at 16 wherein the visual carrier, the aural carrier, and the chroma subcarrier are shown as oscillating synchronously about their normal frequencies VC, AC and CC, respectively, by a frequency difference Δf. The frequencies of the sidebands of each carrier undergo the same frequency variation, and the magnitude of Δf is determined by the combination of the oscillator 8, the aural frequency souce 10, and the varactor 11.

RESPONSE OF A STANDARD TV RECEIVER

Although a standard TV receiver cannot be tuned to the portion of the spectrum occupied by the encoded channels, it would only be necessary to heterodyne these channels with an appropriate frequency in order to translate them to frequencies to which the receiver can be tuned. The integrity of such a system would not be sufficient for pay TV systems. The following is an explanation of the response of a standard TV receiver to a channel that is encoded in accordance with this invention and translated to one of the channels to which the receiver can be tuned.

FIG. 2A is an enlarged view of the carrier variations shown at 16 of FIG. 1, and FIG. 2B illustrates the IF response of a typical intermediate frequency amplifier of a color television receiver. The visual IF carrier, $VC_{IF}$, the chroma IF carrier, $CC_{IF}$, and the aural IF carrier, $AC_{IF}$, are shown at frequency domain positions respectively corresponding to their RF counterparts in FIG. 2A, so that the relative frequencies of the IF response are inverted from those usually employed. This is done for purposes of clarity.

As explained in connection with FIG. 1, all radio frequencies of the channel oscillate at an aural rate about their normal frequency so that the visual carrier VC, the chroma subcarrier CC, and the aural carrier AC vary on either side of their center frequencies by $\Delta f$, as shown in FIG. 2A. After the radio frequencies have been translated to intermediate frequencies by the mixer or first detector of the receiver, the normal frequencies of these carriers appear at the output of the intermediate frequency amplifier as respectively indicated by $VC_{IF}$, $CC_{IF}$ and $AC_{IF}$ in FIG. 2B and vary above and below their normal frequencies by $\Delta f$.

The intermediate frequencies representing the line and field synchronizing information are close to the frequency of the visual intermediate frequency carrier $VC_{IF}$ so that, as it and they vary up and down in frequency, the amplitude of the synchronizing components will vary beyond limits that can be accommodated by the automatic gain control system and automatic fine tuning circuit of the receiver. Line and field synchronization is therefore lost and the video signal is amplitude-modulated at a rate equal to the frequency of the audio frequency source 10. Furthermore, the phase of the intermediate frequency visual carrier $VC_{IF}$, and the phase of the intermediate frequency aural carrier $AC_{IF}$, will vary differently as the carriers move with respect to the IF response of the intermediate frequency amplifier. In an intercarrier sound receiver, the best frequency between the carriers $VC_{IF}$ and $AC_{IF}$ will therefore be phase-modulated so as to cause severe distortion of the aural signals detected in the frequency modulation detector. In receivers not using intercarrier sound, the frequency variation of $\pm \Delta f$ of the aural intermediate frequency carrier $AC_{IF}$ will cause the signal applied to the frequency modulation detector to vary in phase and amplitude so as to render the sound unintelligible.

DECODER

Figure 3:
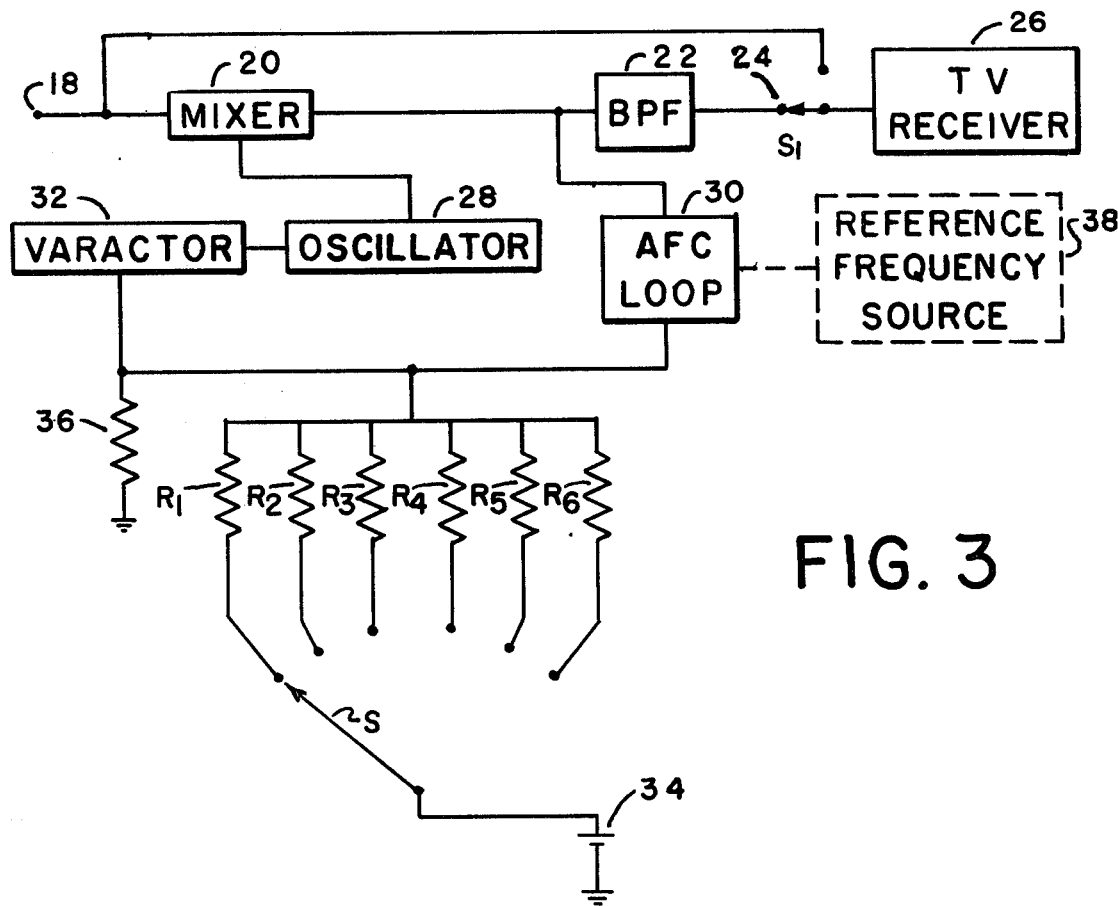
FIG. 3 schematically illustrates a decoder constructed in accordance with the invention.

The band of encoded TV channels at the output 14 of the encoder of FIG. 1 is applied to a cable distribution system, and the input 18 of a decoder shown in FIG. 3 is connected to the cable. Each of the encoded channels varies in frequency as indicated at 16 in FIG. 1 and in FIG. 2A. In one embodiment of the invention, a mixer 20 and a single TV channel band pass filter 22 are connected in series in the order named between the input 18 and an output 24 of the decoder. When installed, the output 24 of the decoder is connected to radio frequency input of a standard television receiver 26. Means such as an oscillator 28 are provided for applying alternating current waves to the mixer 20 so as to translate the frequency band including all of the encoded channels so that at least one of them falls within the pass band of the single channel filter 22. The channel frequencies passed by the filter 22 are preferably those of an unused channel, and the TV receiver 26 is tuned to this channel.

Without more, however, the receiver 26 would reproduce distorted pictures and sound because, as previously explained, all frequencies in the encoded channels are varied by an amount $\Delta f$ about their normal values by the combination of the audio frequency source 10, the varactor 11, and the oscillator 8 shown in the encoder of FIG. 1. In order to eliminate these $\pm \Delta f$ frequency variations, means are provided for producing a control signal that varies in synchronism with them. The control signal is applied to means for varying the frequency of the oscillator 28 so that the frequency variation of $\Delta f$ is essentially eliminated in the channel signals emerging from the mixer 20. Such a control signal can be provided by an automatic frequency control loop 30 that is coupled to the output of the mixer 20. The loop 30 may be tuned to respond to the visual carrier frequency of any of the encoded channels and, if needed, a narrow band pass filter tuned to the visual carrier frequency can be inserted between the output of the mixer 20 and the input of the loop 30. The varying voltage supplied by the automatic frequency control loop 30 is applied to a varactor 32, so as to change the tuning capacitance for the tuned circuits, not shown, of the oscillator 28, thereby changing its frequency.

In order to translate the frequencies of any encoded channel into the pass band of the single channel band pass filter 22, means are provided for applying an appropriate direct current voltage to the varactor 32. In the embodiment of the decoder illustrated in FIG. 3, the latter means is comprised of a battery 34 having one terminal connected to ground and the other terminal selectively connected by a switch S to ends of differently valued resistors $R_1$-$R_6$. The other ends of the resistors are connected to ground via a resistor 36. Thus, the varying potential supplied by the AFC loop 30 is superimposed across the resistor 36 onto the fixed direct current potential selected by connecting the switch S to one of the resistors $R_1$-$R_6$. As the frequency of the visual carrier is varied by the encoder of FIG. 1, the AFC loop 30 provides a control voltage that varies in the same way. Its amplitude must be set so as to cause the oscillator 28 in the decoder to vary in frequency by $\Delta f$, i.e., the same amount as the oscillator 8 on the encoder of FIG. 1. The radio frequency signal thus produced at the output 24 of the decoder is very much the same as indicated at 2 in FIG. 1, the only difference being that some small frequency variation is required to operate the AFC loop 30, as in any servo system. This residual frequency deviation is adjusted so that it is not visible in the TV picture or audible in the TV sound.

The varying control voltage applied to the varactor 32 could be provided by a frequency modulation detector. Alternatively, a phase-locked loop could be substituted for the AFC loop 30, in which case a reference oscillator, indicated by a dotted rectangle 38, would supply a voltage to the phase-locked loop having a frequency of the visual carrier of any one of the encoded TV channels.

In the system described, economy is achieved because a number of TV channels, each at a different TV channel frequency allocation, can be simultaneously encoded by heterodyning them in the same circuit with the output of the oscillator 8 of FIG. 1. Each TV channel appears at the encoder output 14 with the same channel spacing as it had at the input 3. Any of the encoded TV channels may then be selected by setting the switch S so that the frequency of the oscillator 28 is such as to heterodyne the channel into the frequency band passed by the band pass filter 22. The user sets the switch S to the desired channel and sets the tuning of the receiver to the unused channel selected by the filter 22.

Whereas the circuits just described simplify the selection of a given encoded channel, it would be possible in accordance with the invention to apply a fixed direct current voltage to the varactor 32 so as to cause the oscillator 28 to have the center frequency required to heterodyne the visual carrier of any one of the encoded channels to the frequency to which the automatic frequency control loop 30 is responsive. Since this frequency is the same as the visual carrier frequency of a standard channel to which the television receiver may be tuned, the encoded channels can be made to coincide with standard channels, and selection of the desired encoded channel can be effected by setting the tuner of the receiver 26. Thus, the band pass filter 22 is not required. Some of the encoded channels may coincide with standard channels that are available via input terminal 18 so that neither the standard nor the encoded channel can be viewed on the receiver 26 without interference. This problem is easily overcome by providing a switch S₁ for switching the RF input of the receiver 26 from the input terminal 18 to the output terminal 24 of the decoder.

The amount and kind of distortion produced in the picture and sound of a standard television receiver not equipped with a decoder by encoding the radio frequency signals as described herein depends on the frequency variation Δf by which the oscillator 8 of FIG. 1 swings about its normal value under the control of the aural frequency of the source 10. Values of Δf from one-half megacycle to two megacycles and an aural frequency between 250 and 260 cycles have been found to work well.

It is also apparent that the cyclic variations in the frequencies of the encoded TV channels may be such as to increase or decrease with respect to their normal values, i.e., they can vary in one direction from normal rather than oscillate about it.

What is claimed is:

1. A system for encoding and decoding a modulated carrier wave, comprising an encoder comprised of means for varying the frequency of the carrier wave and the frequencies of the modulation thereof, when present, with respect to their normal values in a cyclic manner so that the frequency of the carrier wave varies beyond limits that can be accommodated by the automatic fine tuning circuit of a receiver, a decoder comprising means responsive to the said cyclic variation of the frequency of the carrier wave with respect to its normal value for producing an alternating current frequency wave that varies with respect to a frequency different from the normal frequency of said carrier wave in the same cyclic manner, and means for heterodyning the carrier wave and the modulations thereof with the alternating current frequency wave supplied by said decoder so as to produce a carrier wave and modulations thereof that have frequencies that are substantially free from the said cyclic variation.

2. A decoder for decoding an encoded signal comprised of a carrier wave and modulations thereof, the frequencies of which have been varied with respect to their normal values in a cyclic manner so that the frequency of the carrier wave varies beyond limits that can be accommodated by the automatic fine tuning circuit of a receiver, comprising a mixer having a first input to which the encoded signal may be applied, a second input, and an output, a source of alternating current waves, means coupling said source of alternating current waves to the second input of said mixer, and means coupled to the output of said mixer and to said source of alternating current waves for varying the frequency of the alternating current waves provided by said source in the said cyclic manner so that the frequency of the carrier wave and the modulations thereof at the output of said mixer maintain their normal values.

3. A decoder for decoding the signals of a television channel that has been encoded by causing all the frequencies in the channel to be varied with respect to their normal values in a given cyclic manner so that the frequency of the carrier wave varies beyond limits that can be accommodated by the automatic fine tuning circuit of a receiver, comprising a mixer having a first input to which the signals of the television channel to be decoded may be applied, a second input, and an output, a band pass filter having a pass band of a single channel coupled to the output of said mixer, a source of alternating current waves, means coupling said latter source to said second input of said mixer, the normal frequency of the alternating current waves being such as to translate the frequencies of the encoded channel so that at least some of them lie within the pass band of said band pass filter, means coupled to the output of said mixer for deriving therefrom a control signal that varies in synchronism with the frequency variation of the encoded channels with respect to their normal values, and means for varying the frequency of the alternating current waves provided by said source with said control signal so as to nearly eliminate the cyclic variations in frequency of the signals of the TV channels with respect to their normal values that would otherwise be present in the signals for these channels appearing at the output of said mixer.

* * * * *